United States Patent [19]

Wymelenberg

[11] Patent Number: 5,523,940
[45] Date of Patent: Jun. 4, 1996

[54] FEEDBACK CONTROL CIRCUIT FOR A SYNCHRONOUS RECTIFIER HAVING ZERO QUIESCENT CURRENT

[75] Inventor: Joseph V. Wymelenberg, Mountain View, Calif.

[73] Assignee: Micro Linear Corporation, San Jose, Calif.

[21] Appl. No.: 246,837

[22] Filed: May 20, 1994

[51] Int. Cl.[6] .............................................. H02M 3/335
[52] U.S. Cl. .............................. 363/127; 363/56; 363/21
[58] Field of Search .............................. 363/129, 15, 16, 363/84, 89

[56] References Cited

U.S. PATENT DOCUMENTS

| | | | |
|---|---|---|---|
| 4,941,080 | 7/1990 | Sieborger | 363/127 |
| 5,144,547 | 9/1992 | Masamoto | 363/127 |
| 5,303,138 | 4/1994 | Rozman | 363/21 |
| 5,317,499 | 5/1994 | Brakus | 363/56 |

*Primary Examiner*—Peter S. Wong
*Assistant Examiner*—Aditya Krishnan
*Attorney, Agent, or Firm*—Haverstock & Associates

[57] ABSTRACT

The present invention is for an active rectifier for use in a DC to DC converter wherein a feedback control circuit activates and de-activates the current conduction between the input and the output. Preferably, the current conductor between the input and the output is a P-type MOSFET, wherein the feedback control circuitry provides the activation or de-activation signal to the gate of this transistor. The feedback control circuitry provides an activation signal to the transistor when the input voltage is greater than the output voltage, and provides a de-activation signal to the transistor when the input voltage is equal to or less than the output voltage. Because the P-MOS rectifier has a lower voltage drop than the Schottky diode, the forward drop is reduced. In addition, the feedback control circuit is designed to draw no current except when the P-MOS rectifier is conducting.

6 Claims, 2 Drawing Sheets

Active Rectifier with Feedback Circuitry

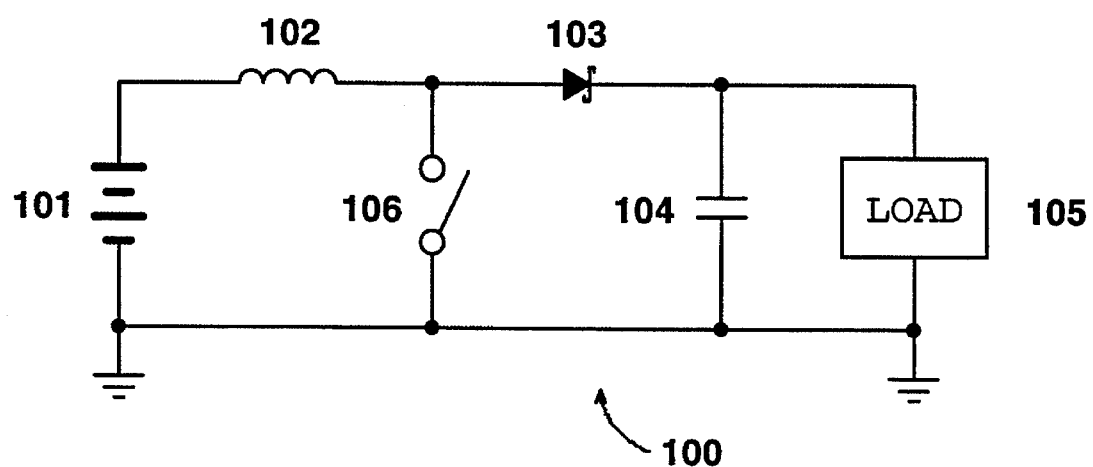
Figure 1: Schottky Diode Rectifier
(Prior Art)

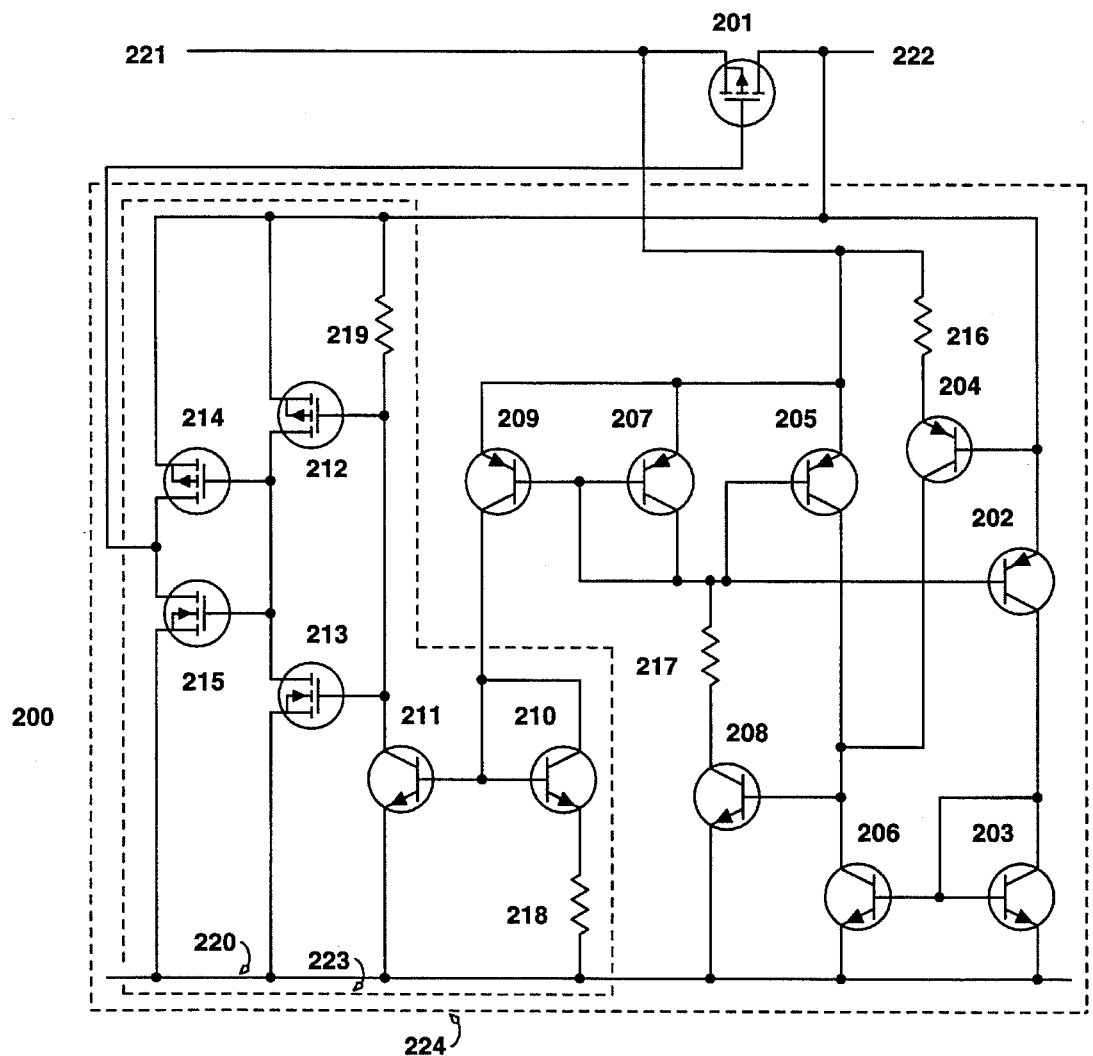
Figure 2: Active Rectifier with Feedback Circuitry 5,523,940

FEEDBACK CONTROL CIRCUIT FOR A SYNCHRONOUS RECTIFIER HAVING ZERO QUIESCENT CURRENT

FIELD OF THE INVENTION

This invention relates to the field of rectifiers. More particularly, this invention relates to an active rectifier for use in a DC to DC converter wherein the rectifier includes a feedback control circuit such that the circuit provides reduced parasitic power loss.

BACKGROUND OF THE INVENTION

A typical DC to DC converter includes a rectifier, usually a Schottky diode, to virtually eliminate current flow in the reverse direction. A Schottky diode provides a low forward voltage drop, normally around 0.3 volts. This low forward drop provides low power loss while current conducts through the diode.

Referring to FIG. 1, a circuit 100 depicts a typical example of a DC to DC converter. When the switch 106 is closed, current flows through the circuit loop including a DC power supply 101 (usually a battery source), an inductor 102 and the switch 106 so that the inductor 102 builds up and stores energy. When the switch is opened, the energy stored in the inductor 102 is converted to current and conducts through a Schottky diode 103 and stored as energy in a capacitor 104.

A switch 106 is toggled to convert an input DC voltage level to an output DC voltage level. Conventional converters use an MOS transistor as the switch 106. After the inductor 102 is discharged into the capacitor 104, the energy stored in the capacitor 104 drives the load 105. The rectifying effect of the Schottky diode prevents the energy stored in the capacitor 104 from flowing through the switch to ground or back through the inductor to the battery.

Unfortunately, the circuit has a parasitic energy loss due to the forward voltage drop across the Schottky diode 103. During the time that the diode 103 is conducting the power loss is approximately equal to the voltage drop times the forward current.

The circuit has three operating modes. In the first mode the inductor 102 is charged. In the second mode, the switch 106 is opened and the energy stored in the inductor 102 is discharged into the capacitor 104. In the third operating mode, the system enters a quiescent mode until another charging cycle is needed. Typical durations for the quiescent state to the active charging states will vary with load current and may be on the order of 1000:1 for light loads. For example, the charging and discharging activity may take place in 10 μS while the circuit is quiescent for 10 mS.

To avoid the problems associated with the 0.3 volt drop across a typical Schottky diode, others have used a P-type MOSFET and a control circuit as the rectifier. The voltage drop across a typical P-type MOSFET is in the 10–100 mV range when conducting. However, an active control circuit is required to control such MOSFET rectifiers by switching them between the triode region and cut-off. Prior art control circuits necessarily draw current in order to effectuate the control of the MOSFET rectifier. Because of the relative duration of the quiescent mode, this current draw for the control circuit is significant. What is needed is an active rectifier in a DC to DC power converter having a control circuit that draws no current except when the rectifier conducts current.

SUMMARY OF THE INVENTION

The present invention is for an active rectifier for use in a DC to DC converter wherein a feedback control circuit activates and de-activates the current conduction between the input and the output. Preferably, the current conductor between the input and the output is a P-type MOSFET, wherein the feedback control circuitry provides the activation or de-activation signal to the gate of this transistor. The feedback control circuitry provides an activation signal to the transistor when the input voltage is greater than the output voltage, and provides a de-activation signal to the transistor when the input voltage is equal to or less than the output voltage. Because the P-MOS rectifier has a lower voltage drop than the Schottky diode, the forward drop is reduced. In addition, the feedback control circuit is designed to draw no current except when the P-MOS rectifier is conducting.

BRIEF DESCRIPTION OF THE DRAWINGS

FIG. 1 is a schematic illustration of a typical example of a DC to DC converter with a Schottky rectifier.

FIG. 2 is a schematic illustration of the rectifier and feedback control circuit of the present invention.

DETAILED DESCRIPTION OF THE PREFERRED EMBODIMENT

The present invention replaces the Schottky diode 103, as depicted in FIG. 1, with an active rectifier circuit, as depicted in FIG. 2. Referring to FIG. 2, the active rectifier circuit of the preferred embodiment 200 provides improved power efficiency over the prior art. Like the Schottky diode, the circuit performs the function of virtually eliminating reverse current. However, because the active rectifier conducts across a P-MOS transistor 201 operating in the triode region, instead of a Schottky diode, the voltage drop across the rectifier is reduced. Typical voltage drop across a P-MOS transistor in saturation is in the 10–100 mV range. This dramatically reduces the voltage drop across the rectifier and thus, the parasitic power loss. More importantly, the circuit for controlling the transistor 201 i.e., the feedback control circuit 224, draws no current except when the transistor 201 is controlled to conduct current. Thus, the feedback control circuit 224 draws no current during the relatively long quiescent time and during the time that the inductor 102 (FIG. 1) is charging. The control circuit only draws current during the brief time that the energy stored on the inductor 102 is discharged and stored on the capacitor 104.

PHYSICAL CHARACTERISTICS OF THE PREFERRED EMBODIMENT

The feedback control circuit 224 of the preferred embodiment includes transistors 202 to 215 and resistors 216 to 219. More specifically, the transistor 202 is a pnp bipolar transistor having a base, an emitter coupled to the output 222, and a collector. The transistor 203 is an npn bipolar transistor having a base, an emitter coupled to a reference node 220, preferably ground, and a collector coupled to the base of the transistor 203 and the collector of the transistor 202. The transistor 204 is a pnp bipolar transistor having a base coupled to the output 222, an emitter, and a collector. The transistor 205 is a pnp bipolar transistor having a base coupled to the base of the transistor 202, an emitter coupled to input 221, and a collector coupled to the collector of the transistor 204. The transistor 206 is an npn bipolar transistor having a base coupled to the base of the transistor 203, an emitter coupled to reference node 220, and a collector coupled to the collector of the transistor 205. The transistor 207 is a pnp bipolar transistor having a base, an emitter coupled to the input 221, and a collector coupled to the base of the transistor 207 and the base of the transistor 205. The transistor 208 is an npn bipolar transistor having a base coupled to the collector of the transistor 206, an emitter coupled to the reference node 220, and a collector. The transistor 209 is a pnp bipolar transistor having a base coupled to the base of the transistor 207, an emitter coupled to input 221, and a collector. The transistor 210 is an npn bipolar transistor having a base, an emitter, and a collector coupled to the base of the transistor 210 and the collector of the transistor 209. The transistor 211 is an npn bipolar transistor having a base coupled to the base of the transistor 210, an emitter coupled to the reference node 220, and a collector.

The transistor 212 is a p-type enhancement MOSFET having a gate coupled to the collector of the transistor 211, a source coupled to output 222, and a drain. The transistor 213 is an n-type enhancement MOSFET having a gate coupled to the collector of the transistor 211, a source coupled to the reference node 220, and a drain coupled to the drain of the transistor 212. The transistor 214 is a p-type enhancement MOSFET having a gate coupled to the drain of the transistor 212, a source coupled to output 222, and a drain coupled to the gate of the transistor 201. The transistor 215 is an n-type enhancement MOSFET having a gate coupled to the drain of the transistor 212, a source coupled to the reference node 220, and a drain coupled to the gate of the transistor 201.

The resistor 216, preferably 20 Kilo-ohms, is coupled to input 221 and the emitter of the transistor 204. The resistor 217, preferably 300 Kilo-ohms, is coupled to the base of the transistor 205 and the collector of the transistor 208. The resistor 218, preferably 20 Kilo-ohms, is coupled to the emitter of the transistor 210 and the reference node 220. And, the resistor 219, preferably 20 Kilo-ohms, is coupled to the collector of the transistor 211 and output 222.

OPERATIONAL CHARACTERISTICS OF THE PREFERRED EMBODIMENT

When the Schottky diode, as shown in FIG. 1, is replaced with the active rectifier, 201 as shown in FIG. 2, the DC to DC converter operates as follows:

Current drive to the bases of transistors 202, 205, 207 and 209 comes only from the collector of transistor 208, through resistor 217. The base drive current to transistor 208 is equal to the current in transistor 204 plus the current in transistor 205 minus the current in transistor 206.

$$Ib208 = Ic204 + Ic205 - Ic206$$

Transistors 203 and 206 form a current mirror, such that their base to emitter voltages are equal, causing the current delivered to transistor 203 by transistor 202 to be replicated in transistor 206.

$$Ic206 = Ic202$$

Therefore, the current mirror acts to cause the base drive to transistor 208 to be equal to the current in the start up transistor 204 plus the current in transistor 205 minus the current in transistor 202.

$$Ib208 = Ic204 + (Ic205 - Ic202)$$

Neglect the current in start up transistor 204 for the moment. Since the bases of transistors 202 and 205 are connected, and their emitters are connected to opposite sides of the rectifying transistor 201, the difference current provided at the base of transistor 208 indicates the polarity of the voltage across the rectifying transistor 201. Specifically, when the input voltage 221 is higher than the output voltage 222, transistor 205 will have a larger base to emitter voltage than transistor 202, and the base drive to transistor 208 will be positive. Likewise, when the input voltage 221 is lower than the output voltage 222, the base drive to transistor 208 will be negative. When the base drive to transistor 208 is positive, it conducts current to the bases of transistors 202, 205, 207 and 209 reinforcing its own base drive. Base drive to transistors 202, 205, 207 and 209 is limited by resistor 217. When the base drive to transistor 208 is negative, it turns off, leaving transistors 202, 205, 207 and 209 with no base drive, and therefore also off. In this manner, current conduction only occurs in this part of the circuit when the input 221 is higher than the output 222.

When making a transition from the off state to the on state, the feedback control circuit 224 just described will have a tendency to remain off for lack of drive current to any transistor. Therefore, transistor 204 is added to provide an initial base current to transistor 208 to get conduction started. More specifically, when the input 221 rises to around 0.7 V above the output 222, the base to emitter voltage of transistor 204 becomes forward-biased and the current from its collector provides a start up current to the base of transistor 208. Once the circuit is started and the rectifying transistor 201 turns on, the voltage from the input 221 to the output 222 will drop to less than 0.2 V and transistor 201 will turn off. Resistor 216 limits the current in transistors 204 and 208 during start up, protecting them from damage. During the brief instance that the feedback control circuit 224 is turning on, inductor current is delivered to the output through the parasitic body diode of the P-type MOSFET transistor 201.

Gate drive to transistor 201 is generated by an output stage 223 consisting of transistors 210–215 and resistors 218–219 (see FIG. 2). More specifically, when the feedback control circuit 224 senses that the input 221 is higher than the output 222 and turns on transistor 209, current is conducted to transistor 210 and the base of transistor 211. When the base of transistor 211 is driven, it saturates and its collector pulls the gates of transistors 212 and 213 low. Transistors 212 and 213 form an inverter such that when the voltage at their gates is low, the voltage at their drains is high, and when the voltage at their gates is high, the voltage at their drains is low. Another inverter is formed with transistors 214 and 215. By placing two inverters in series as shown, the voltage at the input, the collector of transistor 211 is the same polarity as the output, the gate of transistor 201. Therefore, when the collector of transistor 211 pulls low, the gate of transistor 201 is also pulled low, turning it on and conducting current from the input 221 to the output 222. The inverters are used primarily to provide extra gain which increases switching speed.

When the feedback control circuit 224 senses that the input 221 is lower than the output 222, transistor 209 turns off removing the drive current to transistor 211. Transistor 210 and resistor 218 are added to discharge the base of transistor 211 quickly once drive current from transistor 209 is removed. When transistor 211 turns off, resistor 219 pulls the gates of transistors 212 and 213 high. As previously described, the pair of series connected inverters driven with a high voltage from the collector of transistor 211 will pull the gate of the rectifying transistor high, turning it off and blocking conduction in the reverse direction. Notice that, again in the off state no current is conducted in any portion of the output stage 223.

Although the present invention has been described in detail, it is clearly understood that the same is by way of illustration and example only and is not to be taken by way of limitation, the limit and scope of the present invention being limited only by the terms of the appended claims.

I claim:

1. A rectifying circuit for a power converter having an input voltage and an output voltage comprising:
   a. an active current conductor having an input node, the current conductor further having an active state for conducting current and an inactive state for blocking current; and
   b. a feedback control circuit coupled to the input node of the current conductor for selectively setting the current conductor to the active state and to the inactive state, wherein the feedback control circuit only draws current when the current conductor is in the active state.

2. The rectifying circuit according to claim 1 wherein the current conductor is an MOS transistor.

3. The rectifying circuit according to claim 2 wherein the MOS transistor is a P-type MOS transistor.

4. The rectifying circuit according to claim 1 wherein the current conductor has an input node with an input voltage and an output node with an output voltage wherein the feedback control circuit is coupled to compare the input voltage to the output voltage without drawing power in the inactive state.

5. The rectifying circuit according to claim 4 wherein the feedback control circuit controls the current conductor to enter the active state when the output voltage is lower than the input voltage.

6. A rectifying circuit for a rectifier having an input and an output comprising:
   a. a first PMOS transistor having a first gate, a first source coupled to said input, and first drain coupled to said output;
   b. a second pnp bipolar transistor having a second base, a second emitter coupled to said output, and a second collector;
   c. a reference node providing a reference voltage;
   d. a third npn bipolar transistor having a third base, a third emitter coupled to said reference node, and a third collector coupled to said third base and said second collector;
   e. a fourth pnp bipolar transistor having a fourth base coupled to the output, a fourth emitter, and a fourth collector;
   f. a fifth pnp bipolar transistor having a fifth base coupled to said second base, a fifth emitter coupled to said input, and a fifth collector coupled to said fourth collector;
   g. a sixth npn bipolar transistor having a sixth base coupled to the third base, a sixth emitter coupled to said reference node, and a sixth collector coupled to said fifth collector;
   h. a seventh pnp bipolar transistor having a seventh base, a seventh emitter coupled to said input, and a seventh collector coupled to said seventh base and said fifth base;
   i. an eighth npn bipolar transistor having an eighth base coupled to the sixth collector, an eighth emitter coupled to said reference node, and an eighth collector;
   j. a ninth pnp bipolar transistor having a ninth base coupled to the seventh base, a ninth emitter coupled to the input, and a ninth collector;
   k. a tenth npn bipolar transistor having a tenth base, a tenth emitter, and a tenth collector coupled to the tenth base and the ninth collector;
   l. an eleventh npn bipolar transistor having an eleventh base coupled to the tenth base, an eleventh emitter coupled to the reference node, and an eleventh collector;
   m. a twelfth PMOS transistor having a twelfth gate coupled to the eleventh collector, a twelfth source coupled to the output, and a twelfth drain;
   n. a thirteenth NMOS transistor having a thirteenth gate coupled to the eleventh collector, a thirteenth source coupled to the reference node, and a thirteenth drain coupled to the twelfth drain;
   o. a fourteenth PMOS transistor having a fourteenth gate coupled to the twelfth drain, a fourteenth source coupled to the output, and a fourteenth drain coupled to the first gate;
   p. a fifteenth NMOS transistor having a fifteenth gate coupled to the twelfth drain, a fifteenth source coupled to the reference node, and a fifteenth drain coupled to the first gate;
   q. a first resistor coupled to said input and said fourth emitter;
   r. a second resistor coupled to said fifth base and said eighth collector;
   s. a third resistor coupled to said tenth emitter and said reference node; and
   t. a fourth resistor coupled to eleventh collector and said output.

* * * * *